United States Patent
Lee (10) Patent No.: US 9,729,797 B2
(45) Date of Patent: Aug. 8, 2017

(54) ELECTRONIC APPARATUS AND METHOD OF CONTROLLING THE SAME

(71) Applicant: SAMSUNG ELECTRONICS CO., LTD., Suwon-si, Gyeonggi-do (KR)

(72) Inventor: Myung-hun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 14/532,248

(22) Filed: Nov. 4, 2014

(65) Prior Publication Data

US 2015/0138419 A1    May 21, 2015

(30) Foreign Application Priority Data

Nov. 20, 2013 (KR) .................. 10-2013-0141474

(51) Int. Cl.
*H04N 5/235* (2006.01)
*G03B 9/42* (2006.01)
*H04N 5/232* (2006.01)

(52) U.S. Cl.
CPC .......... *H04N 5/2353* (2013.01); *G03B 9/42* (2013.01); *H04N 5/23212* (2013.01)

(58) Field of Classification Search
CPC ............ H04N 5/2353; H04N 5/235; G03B 9/08–9/54; G03B 9/64
USPC ................. 348/296; 396/452–510
See application file for complete search history.

(56) References Cited

U.S. PATENT DOCUMENTS

| 7,972,069 | B2 * | 7/2011 | Shintani | G03B 9/08 396/452 |
|---|---|---|---|---|
| 8,063,944 | B2 | 11/2011 | Kido | |
| 8,317,418 | B2 | 11/2012 | Hwang | |
| 8,405,762 | B2 | 3/2013 | Moon | |
| 2010/0158504 | A1 * | 6/2010 | Moriyama | G03B 9/28 396/479 |
| 2011/0164871 | A1 * | 7/2011 | Shintani | G03B 9/40 396/484 |
| 2012/0229687 | A1 | 9/2012 | Lee | |
| 2012/0229698 | A1 * | 9/2012 | Tsubono | G03B 9/08 348/363 |
| 2012/0293708 | A1 | 11/2012 | Ryu et al. | |

FOREIGN PATENT DOCUMENTS

| JP | 2010-034818 A | 2/2010 |
|---|---|---|
| KR | 10-2008-0100756 A | 11/2008 |
| KR | 10-2011-0079225 A | 7/2011 |
| KR | 10-1080426 B1 | 10/2011 |

OTHER PUBLICATIONS

PCT Search Report and Written Opinion issued for PCT/KR2014/010728 (Jan. 23, 2015).

* cited by examiner

*Primary Examiner* — Lin Ye
*Assistant Examiner* — Chriss Yoder, III
(74) *Attorney, Agent, or Firm* — Drinker Biddle & Reath LLP (57) ABSTRACT

A shutter lag from when a shutter button is fully pressed to when an exposure is actually performed may be reduced by performing a precedence operation for a state transition of a shutter when the shutter button is half pressed.

22 Claims, 8 Drawing Sheets

ELECTRONIC APPARATUS AND METHOD OF CONTROLLING THE SAME

CROSS REFERENCE TO RELATED APPLICATIONS

This application claims the benefit of Korean Patent Application No. 10-2013-0141474, filed on Nov. 20, 2013, in the Korean Intellectual Property Office, the disclosure of which is incorporated herein in its entirety by reference.

BACKGROUND

Field

One or more embodiments relate to an electronic apparatus and a method of controlling the same.

Description of the Related Art

Recently, in digital cameras including a focal plane shutter called digital-single lens reflex (DSLR), digital cameras using an electronic front curtain shutter (front shutter) technology for controlling an exposure start timing according to pixel lines (i.e., pixel columns or pixel rows) such as to match an operation characteristic of a mechanical rear shutter have been commercialized. While transferring from a live-view state to a still image capturing operation, a digital camera using a general mechanical front curtain shutter performs exposure by closing (charging) a mechanical shutter so that an image pickup device is in a shielding state, and then enabling a mechanical front curtain shutter and a mechanical rear curtain shutter to pass in front of the image pickup device in the stated order. In this regard, when the electronic front curtain shutter technology is used, the mechanical shutter is not required to be closed while transferring from the live-view state to the still image capturing operation, and thus a time lag or shutter lag from a point of time when photographing is instructed to a point of time when the photographing starts may be reduced. Also, the mechanical shutter itself may be miniaturized and low priced.

SUMMARY

One or more embodiments include an electronic apparatus and a method of controlling the same, which are capable of reducing a time lag, i.e., a shutter lag, from when a shutter release button is full-pressed to when exposure is actually performed, by providing a shot preparation state between a normal open state and a shot operation state to a shutter operation.

Additional aspects will be set forth in part in the description which follows and, in part, will be apparent from the description, or may be learned by practice of the presented embodiments.

According to one or more embodiments, a method is provided for controlling an electronic apparatus operating by using a focal plane shutter, where the method includes: displaying a live-view in a normal open state of the focal plane shutter; receiving a first shutter release signal and controlling a precedence operation for an exposure of an image sensor according to the received first shutter release signal; receiving a second shutter release signal and performing the exposure according to the received second shutter release signal; and reading out an electric signal accumulated in the image sensor.

The precedence operation may be an operation of holding the focal plane shutter by using an electromagnet by driving a mechanism coupled to the focal plane shutter.

The mechanism may be a rotating-cam.

The method may further include driving a motor transferring power to the rotating-cam.

The method may further include outputting a first timing signal for supplying power to the electromagnet according to the first shutter release signal.

The method may further include outputting a second timing signal for stopping power supplied to the electromagnet according to the second shutter release signal.

The controlling of the precedence operation may include: releasing the mechanism holding a front curtain and a rear curtain of the focal plane shutter in the normal open state; and outputting timing signals for supplying power to a front electromagnet of the front curtain and a rear electromagnet of the rear curtain.

The performing of the exposure may include: outputting a second timing signal for stopping power supplied to the front electromagnet according to the second shutter release signal; and outputting a reset signal to a corresponding row line of the image sensor to correspond to a location of the rear curtain driven on the image sensor according to the second timing signal.

The reset signal may have an offset time.

The offset time may be set to be the same as a time lag from an output timing of the second timing signal for stopping power supplied to the rear electromagnet to a timing when the rear curtain starts to be driven.

A rear curtain of the focal plane shutter may operate as an electronic front curtain by outputting a reset signal to a corresponding row line of the image sensor corresponding to a location driven on the image sensor.

The precedence operation may be a charging operation of the rear curtain.

A motor for driving the focal plane shutter may be driven according to the first shutter release signal.

The precedence operation may be processed in parallel to a focus detection operation according to the first shutter release signal.

The normal open state may be a state in which a front curtain and a rear curtain of the focal plane shutter are opened.

According to one or more embodiments, an electronic apparatus includes: a focal plane shutter; an image sensor; a display unit; and a controller for displaying a live-view on the display unit during a normal open state of the focal plane shutter, receiving a first shutter release signal, controlling a precedence operation for an exposure of the image sensor according to the received first shutter release signal, receiving a second shutter release signal, performing the exposure according to the received second shutter release signal, and reading out an electric signal accumulated in the image sensor.

The precedence operation may be an operation of holding the focal plane shutter by using an electromagnet by driving a mechanism coupled to the focal plane shutter.

The mechanism may be a rotating-cam.

The electronic apparatus may further include a shutter driver for driving a motor transferring power to the rotating-cam.

The electronic apparatus may further include an electromagnet driver for outputting a first timing signal for supplying power to the electromagnet according to the first shutter release signal, and outputting a second timing signal for stopping power supplied to the electromagnet according to the second shutter release signal.

The controller may output a second timing signal for stopping power supplied to a front electromagnet according to the second shutter release signal, and output a reset signal to a corresponding row line of the image sensor to correspond to a location of a rear curtain driven on the image sensor according to the second timing signal.

The reset signal may have an offset time, wherein the offset time may be set to be the same as a time lag from an output timing of the second timing signal for stopping power supplied to the front electromagnet to a timing when the rear curtain starts to be driven.

A rear curtain of the focal plane shutter may operate as an electronic front curtain by outputting a reset signal to a corresponding row line of the image sensor corresponding to a location driven on the image sensor.

The precedence operation may be a charging operation of the rear curtain.

A motor for driving the focal plane shutter may be driven according to the first shutter release signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

As the invention allows for various changes and numerous embodiments, exemplary embodiments will be illustrated in the drawings and described in detail in the written description. However, this is not intended to limit the invention to particular modes of practice, and it will to be appreciated that all changes, equivalents, and substitutes that do not depart from the spirit and technical scope of the invention are encompassed in the invention. In the description below, certain detailed explanations of related art are omitted when it is deemed that they may unnecessarily obscure the essence of the invention.

While such terms as "first", "second" etc., may be used to describe various components, such components must not be limited to the above terms. The above terms are used only to distinguish one component from another. As used herein, the term "and/or" includes any and all combinations of one or more of the associated listed items.

The terms used in the present specification are merely used to describe exemplary embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

One or more embodiments will be described below in more detail with reference to the accompanying drawings. Those components that are the same or are in correspondence are rendered the same reference numeral regardless of the figure number, and redundant explanations are omitted.

In following one or more embodiments, a digital camera is used as an electronic apparatus, which may be a photographing apparatus. However, the electronic apparatus is not limited thereto, and may be a digital device, such as a digital camcorder, a personal digital assistant (PDA), or a smartphone, etc.

Figure 1:
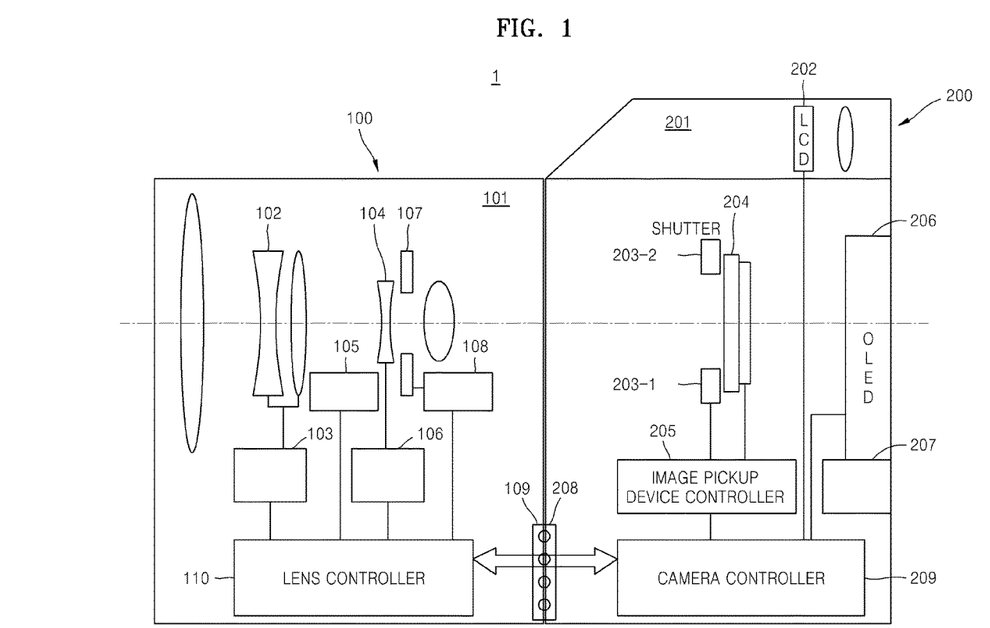
FIG. 1 is a side view block diagram of an electronic apparatus according to an embodiment.

FIG. 1 is a diagram of an electronic apparatus 1 according to an embodiment.

Referring to FIG. 1, the electronic apparatus 1 includes an interchangeable lens 100 and a body unit 200. The body unit 200 controls the interchangeable lens 100 to drive a focus lens 104.

The interchangeable lens 100 (hereinafter referred to as the lens 100) includes an image-forming optical system 101, a zoom lens position detecting sensor 103, a lens driver 105, a focus lens position detecting sensor 106, an iris driver 108, a lens controller 110, and a lens mount 109.

The image-forming optical system 101 includes a zoom lens 102 for adjusting zooming, the focus lens 104 for changing an auto-focus (AF), and an iris 107. The zoom lens 102 and the focus lens 104 may form a lens group including a plurality of lenses.

The zoom lens position detecting sensor 103 and the focus lens position detecting sensor 106 respectively detect positions of the zoom lens 102 and the focus lens 104. A timing for detecting the position of the focus lens 104 may be set by the lens controller 110 or a camera controller 209 described later. For example, the timing for detecting the position of the focus lens 104 may be a timing for performing focus detection based on an image signal.

The lens driver 105 and the iris driver 108 respectively drive the focus lens 104 and the iris 107 by being controlled by the lens controller 110. In detail, the lens driver 105 drives the focus lens 104 in an optical axis direction.

The lens controller 110 transmits information about the detected position of the focus lens 104 to the body unit 200. Here, when the position of the focus lens 104 changes or the camera controller 209 requests for the information about the position of the focus lens 104, the lens controller 110 may transmit the information about the detected position of the focus lens 104 to the body unit 200.

The lens mount 109 includes a lens communication pin that is used as a transmission path of data or a control signal by being engaged with a camera communication pin.

A structure of the body unit 200 will now be described in detail.

The body unit 200 may include an electronic viewfinder (EVF) 201, a shutter 203, an image pickup device 204, an image pickup device controller 205, a display unit 206, a manipulator 207, the camera controller 209, and a camera mount 208.

The EVF 201 includes a liquid crystal display (LCD) 202 and an image may be checked during photographing in real-time.

The shutter 203 determines a time light is applied to the image pickup device 204, i.e., an exposure time. In the current embodiment, the shutter 203 may be a focal plane shutter, and may include a front curtain 203-1 and a rear curtain 203-2.

The image pickup device 204 generates an image signal by capturing an optical signal that passed through the image-forming optical system 101 of the lens 100. The image pickup device 204 may include a plurality of photoelectric converters arranged in a matrix form and a horizontal transmission line for reading an image signal by moving a charge from the photoelectric converters.

The image pickup device controller 205 generates a timing signal, and controls the image pickup device 204 to capture an image in synchronization with the timing signal. Also, the image pickup device controller 205 sequentially reads image signals after charges are accumulated in each scanning line. The read image signals are used for focus detection in the camera controller 209.

The display unit 206 displays various images and information. The display unit 206 may be an organic light-emitting device (OLED) display or an LCD.

The manipulator 207 receives various commands from a user to manipulate the electronic apparatus 1. The manipulator 207 may include various buttons, such as a shutter release button, a main switch, a mode dial, and a menu button.

The camera controller 209 calculates a focus evaluation value by performing focus detection on an image signal generated by the image pickup device 204. Also, according to a timing signal generated by the image pickup device controller 205, the camera controller 209 calculates and stores a focus evaluation value per focus detection time, and calculates a target position of the focus lens 104 based on lens position information received from the lens 100 and the stored focus evaluation value. The camera controller 209 transmits the calculated target position to the lens 100.

The camera mount 208 includes a camera communication pin.

Hereinafter, operations of the lens 100 and the body unit 200 will now be described.

When a subject is to be photographed, an operation of the electronic apparatus 1 starts as the main switch included in the manipulator 207 is manipulated. The electronic apparatus 1 performs a live-view display as follows:

An optical signal of the subject that passed through the image-forming optical system 101 is transmitted to the image pickup device 204. Here, the shutter 203 is in an open state that is defined as a normal open state. At this time, the front curtain 203-1 and the rear curtain 203-2 of the focal plane shutter are mechanically held, and thus the image pickup device 204 is exposed to light. The optical signal transmitted from the lens 100 is converted to an electric signal by the image pickup device 204, and an image signal is generated from the electric signal. The image pickup device 204 operates according to a timing signal generated by the image pickup device controller 205. The image signal of the subject is converted to displayable data by the camera controller 209, and is output to the EVF 201 and the display unit 206. Such operations are called a live-view display, and live-views displayed according to the live-view display are continuously displayed as a moving image.

After the live-view display is performed, the electronic apparatus 1 performs an AF operation when the shutter release button included in the manipulator 207 is half pressed. A first shutter release signal is generated by half pressing the shutter release button, and the half pressing of the shutter release button will now be also referred to as S1. The AF operation is performed by using an image signal generated by the image pickup device 204, wherein the target position of the focus lens 104 is calculated from the focus evaluation value related to a contrast value according to a contrast AF method, and the lens 100 is driven according to the calculated target position. The focus evaluation value is calculated by the camera controller 209. The camera controller 209 calculates information for controlling the focus lens 104 from the focus evaluation value, and transmits the calculated information to the lens controller 110 through lens and camera communication pins respectively included in the lens mount 109 and the camera mount 208.

The lens controller 110 performs the AF operation by controlling the lens driver 105 to move the focus lens 104 in the optical axis direction based on the received information. The position of the focus lens 104 is monitored by the focus lens position detecting sensor 106, and fed back to the camera controller 209.

When the zoom lens 102 is zoomed by the user, the zoom lens position detecting sensor 103 detects the position of the zoom lens 102, and the lens controller 110 performs the AF operation again by changing AF control parameters of the focus lens 104.

When the subject is focused according to operations above, the shutter release button is fully pressed so that the electronic apparatus 1 is exposed to light. A second shutter release signal is generated when the shutter release button is fully pressed, and the fully pressing of the shutter release button will now be also referred to as S2. Here, the camera controller 209 first completely closes the shutter 203, and photometric information obtained so far from the lens controller 110 is transmitted to the camera controller 209, as iris control information. The lens controller 110 controls the iris driver 108 based on the iris control information, and the iris driver 108 drives the iris 107 to have a suitable iris value. The camera controller 209 controls the shutter 203 based on the photometric information, and captures an image of the subject by opening the image pickup device 204 for a suitable exposure time.

An image signal process and a compression process are performed on the captured image, and then the captured image is stored in a memory card 212. At the same time, the captured image is displayed on the EVF 201 and the display unit 206 for displaying the subject. Such a captured image is referred to as a quick-view image.

As such, a series of photographing operations are performed.

Figure 2:
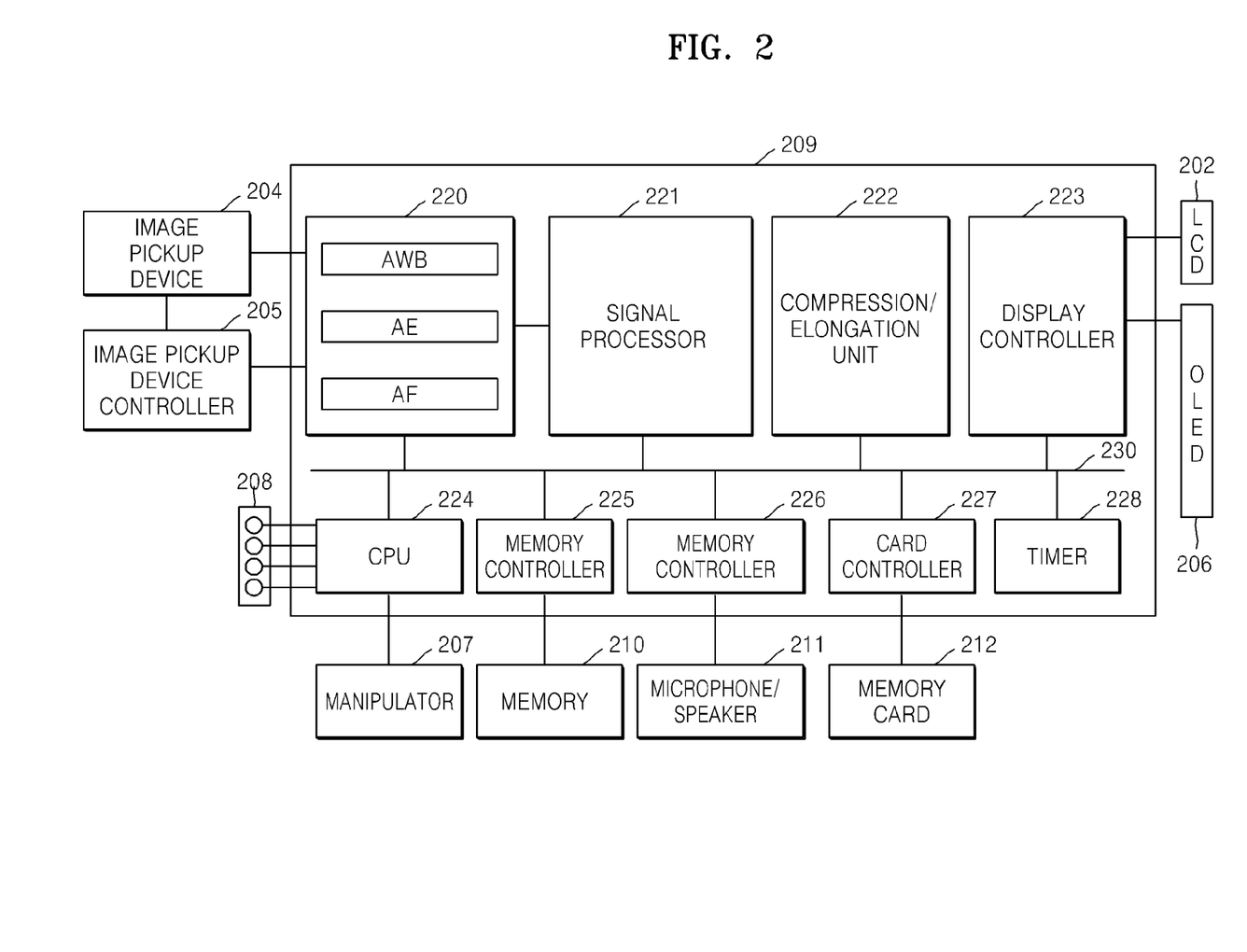
FIG. 2 is a block diagram of a camera controller of FIG. 1, according to an embodiment.

FIG. 2 is a block diagram of the camera controller 209 of FIG. 1, according to an embodiment.

Referring to FIG. 2, the camera controller 209 according to the current embodiment may include a pre-processor 220, a signal processor 221, a compression/elongation unit 222, a display controller 223, a central processing unit (CPU) 224, a memory controller 225, an audio controller 226, a card controller 227, a timer 228, and a main bus 230.

The camera controller 209 transmits various instructions and data to corresponding units through the main bus 230.

The pre-processor 220 performs an auto white balance (AWB) operation, an auto exposure (AE) operation, and an AF operation upon receiving an image signal generated by the image pickup device 204. In detail, the pre-processor 220 includes a focus evaluation value calculator for calculating a focus evaluation value of a focus state from the image signal generated by the image pickup device 204. Also, the pre-processor 220 includes a white balance evaluation value calculator AWB and an exposure evaluation value calculator AE for calculating evaluation values to adjust exposure and white balance.

The signal processor 221 performs a series of image signal processes, such as gamma correction, to generate a live-view or a captured image displayable on the display unit 206.

The compression/elongation unit 222 compresses an image signal in a compression format, such as a JPEG compression format or H.264 compression format. An image file, including image data generated via a compression process, is transmitted to and stored in the memory card 212.

The display controller 223 controls an image output on the LCD 202 of the EVF 201 or a display screen of the display unit 206.

The CPU 224 controls an overall operation of each unit. Also, in the electronic apparatus 1 of FIG. 1, the CPU 224 communicates with the lens 100.

The memory controller 225 controls a memory 210 for temporarily storing data, such as a captured image or image information, and the audio controller 226 controls a microphone or a speaker 211. Also, the card controller 227 controls the memory card 212 for storing a captured image. The timer 228 measures time.

Figure 3A:
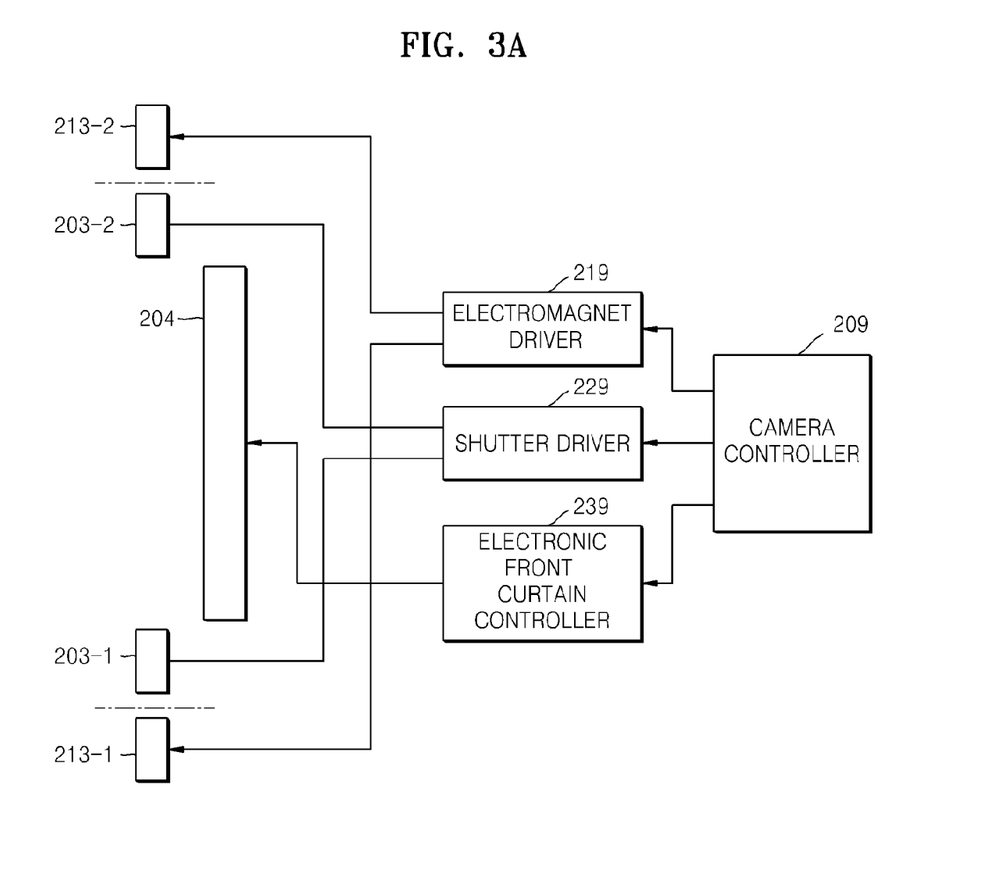
FIGS. 3A through 3C are schematic block diagrams for describing an operation of an electronic apparatus, according to an embodiment.
Figure 3B:
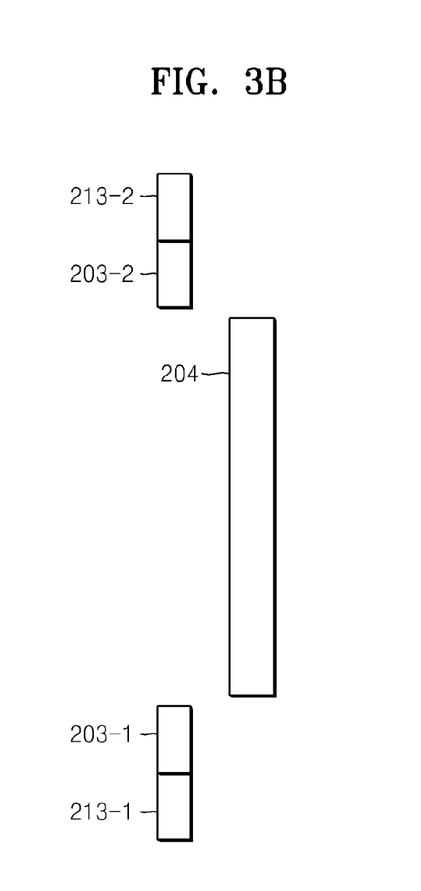
Figure 3C:
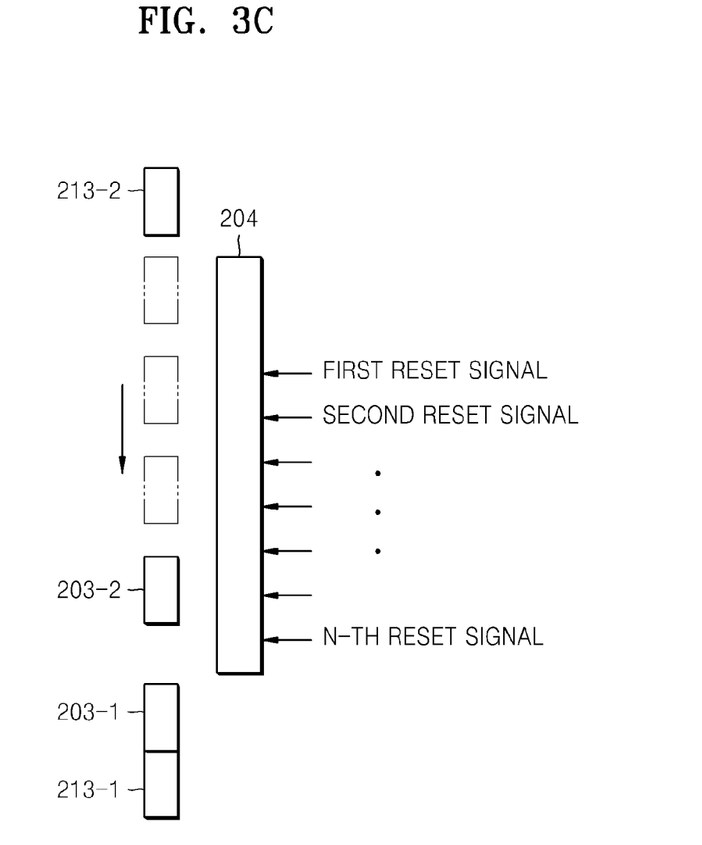

FIGS. 3A through 3C are schematic diagrams for describing an operation of an electronic apparatus, according to an embodiment.

Referring to FIG. 3A, the image pickup device 204, and the front curtain 203-1 and the rear curtain 203-2 of the focal plane shutter are shown, wherein the front curtain 203-1 and the rear curtain 203-2 are driven by a shutter driver 229. The shutter driver 229 may include a rotating-cam (not shown) and a motor (not shown), and when the motor is driven according to a control of the shutter driver 229, the rotating-cam connected to the motor is rotated, and thus the front curtain 203-1 and the rear curtain 203-2 are moved to respectively contact a front electromagnet 213-1 and a rear electromagnet 213-2, as shown in FIG. 3B.

Exposure is controlled by driving the front curtain 203-1 and the rear curtain 203-2 forming the focal plane shutter on the image pickup device 204, according to a control of the shutter driver 229. For example, in a live-view state, the front curtain 203-1 and the rear curtain 203-2 are both opened, and a light passed through a lens forms an image on the image pickup device 204. Then, a photographing operation starts when a shutter release button is fully pressed (a second shutter release signal). According to the second shutter release signal, the front curtain 203-1 is driven upward to combine with the rear curtain 203-2, and thus the focal plane shutter maintains a close state blocking light from entering the image pickup device 204. Then, during an exposure operation, the front curtain 203-1 is driven upward to contact the rear curtain 203-2, and then the front curtain 203-1 and the rear curtain 203-2 are both driven downward while maintaining a slit having a predetermined interval. Here, the slit may be formed according to a start time difference of the front and rear curtains 203-1 and 203-2, and an exposure time may be adjusted according to a driving speed. Next, after the exposure operation is completed, the front and rear curtains 203-1 and 203-2 are both driven downward, and the rear curtain 203-2 is driven till the end to contact the front curtain 203-1. Data accumulated in the image pickup device 204 starts to be read when the exposure operation is completed, i.e., when no light enters the image pickup device 204. According to a general focal plane shutter, an operation of charging the front curtain 203-1 (an operation of driving the front curtain 203-1 upward to contact the rear curtain 203-2 in a live-view state) is required to start an exposure operation, but according to the current embodiment, the front curtain 203-1 is always opened by using an electronic front curtain that does not require a charging operation. An electronic front curtain or an electronic front curtain shutter is realized by an electronic circuit, and the electronic front curtain shutter being driven on an imaging surface means that the electronic front curtain shutter sequentially exposes pixel lines forming the imaging surface. Also, since the electronic front curtain shutter is not a mechanical shutter, exposing of a pixel line means resetting or removing charges accumulated in the pixel line, i.e., zeroing an accumulated charge amount. Driving a mechanical rear shutter on an imaging surface means moving the mechanical rear shutter to sequentially hide pixel lines. In other words, the electronic front curtain is realized to operate as a front curtain of a focal plane shutter by sequentially driving a reset signal of the image pickup device 204 according to lines (rows). However, in this case as well, a rear curtain needs to prepare for an operation to start exposure, and such a preparation generates a shutter lag until an actual exposure, for example, about 20 ms.

In the electronic front curtain shutter according to the current embodiment, when the shutter release button is half pressed (a first shutter release signal) in order to prepare for an operation of the rear curtain 203-2, the motor is driven according to a control of the shutter driver 229. Driving power of the motor operates the rotating-cam, and as shown in FIG. 3B, the rear curtain 203-2 is moved to contact the rear electromagnet 213-2. Here, when power is supplied to the rear electromagnet 213-2 according to a control of an electromagnet driver 219, the rear curtain 203-2 is held. Such processes are defined as a shot ready state in the current embodiment. Thus, the rear curtain 203-2 completes the preparation for an operation in synchronization with the first shutter release signal, and thus causes of a shutter lag generated in the front curtain 203-1 may be removed.

As shown in FIG. 3C, the rear curtain 203-2 that contacts the rear electromagnet 213-2 starts to be detached from the rear electromagnet 213-2 according to a timing signal (i.e., a signal for stopping power supply) of the electromagnet driver 219 on the image pickup device 204, and an electronic front curtain controller 239 outputs a reset signal on a row line of the image pickup device 204 to correspond to a location of the rear curtain 203-2, and thus exposure is performed. In FIG. 3C, the front curtain 203-1 does not move, but alternatively, the front curtain 203-1 may move downward while contacting the rear curtain 203-2.

Figure 4:
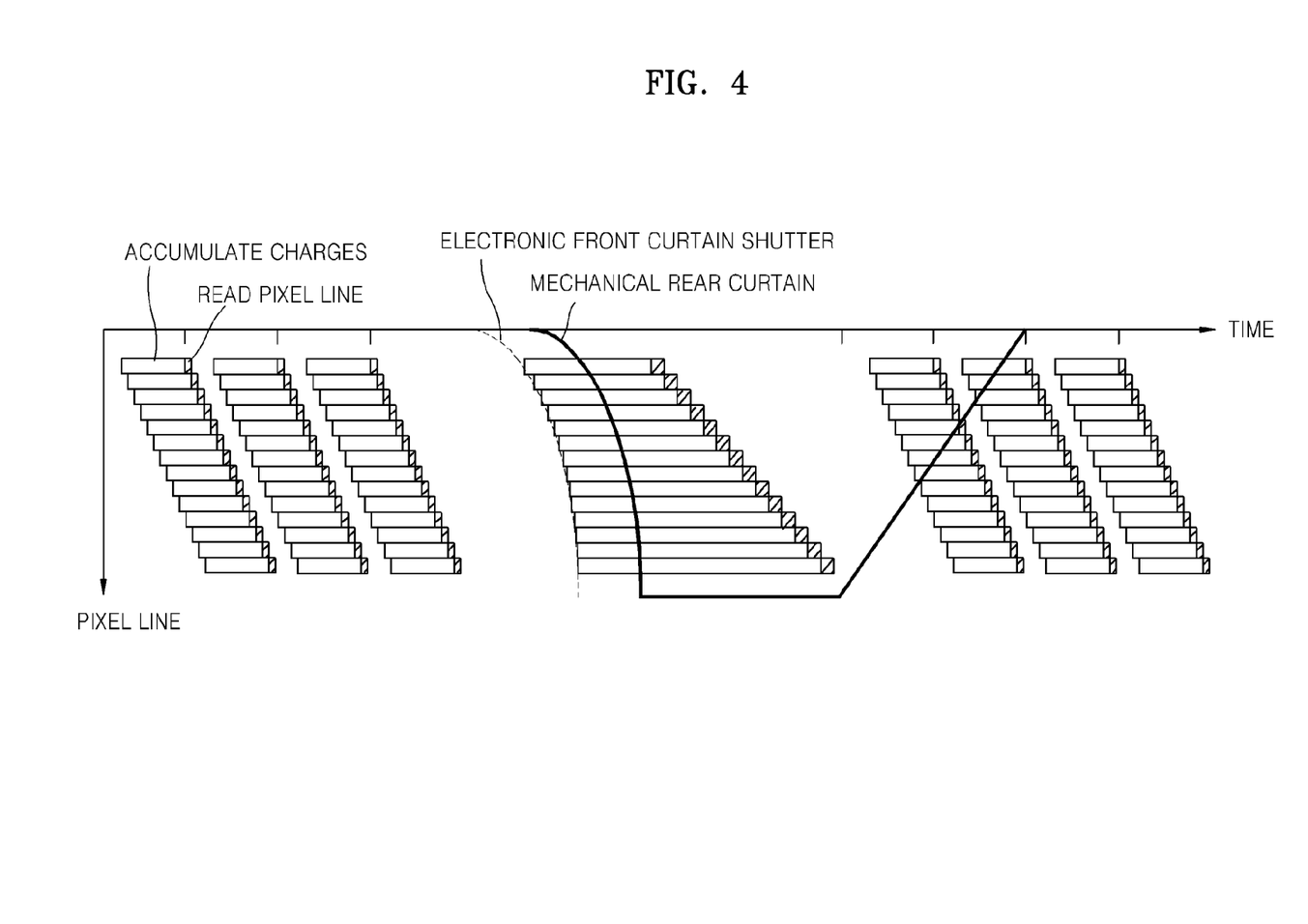
FIG. 4 is a timing diagram for describing operations of an electronic front curtain and a mechanical rear curtain, according to an embodiment.

FIG. 4 is a diagram for describing operations of an electronic front curtain and a mechanical rear curtain, according to an embodiment. As shown in FIG. 4, charge accumulation start timings are misaligned according to pixel lines of the image pickup device 204, i.e., different charge accumulation start timings are set for the pixel lines. This is also referred to as a rolling shutter. In the current embodiment, an electronic front curtain operated in a rolling shutter in order to reduce a shutter lag is described, but alternatively, a global shutter may be used instead of the rolling shutter. FIG. 4 illustrates an exposure start timing line by an electronic front curtain shutter, and a shielding timing line by a mechanical rear curtain shutter. The electronic front curtain shutter is realized by an electronic circuit, and driving of the electronic front curtain shutter on an imaging surface means sequentially exposing pixel lines forming the imaging surface by using the electronic front curtain shutter. Also, since the electronic front curtain shutter is not a mechanical shutter, exposing of a pixel line means resetting or removing charges accumulated in the pixel line, i.e., zeroing an accumulated charge amount. Driving the rear curtain 203-2 on an imaging surface means moving the rear curtain 203-2 to sequentially hide pixel lines.

In the above embodiment described with reference to FIG. 3, the electromagnet driver 219, the shutter driver 229, and the electronic front curtain controller 239 are separately illustrated and described, but they may be realized together with the camera controller 209 such that the camera controller 209 drives a shutter, supplies power to an electromagnet, and control an electronic front curtain.

Figure 5:
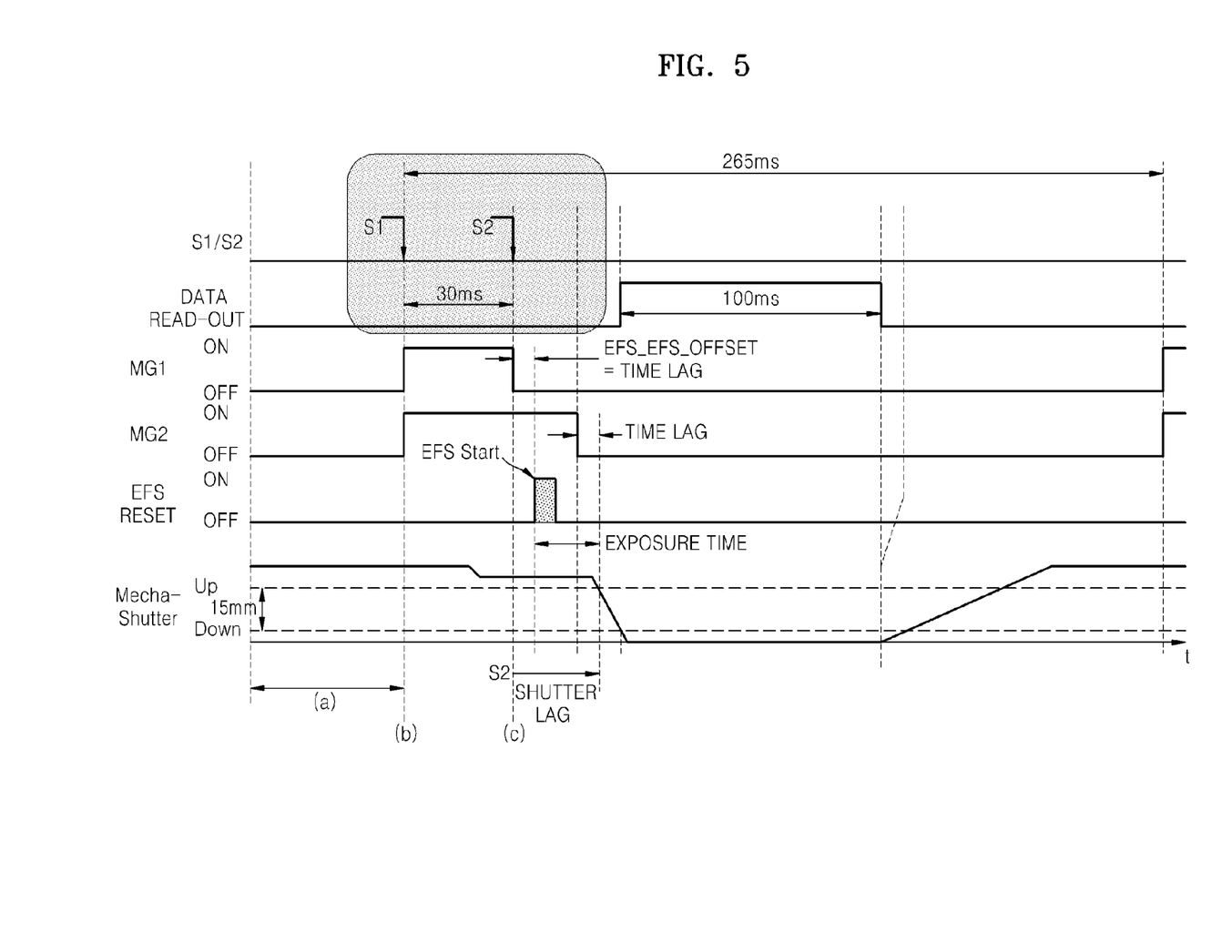
FIG. 5 is a timing diagram for describing control timings of an electronic apparatus, according to an embodiment.

FIG. 5 is a diagram for describing control timings of an electronic apparatus, according to an embodiment. The control timings of FIG. 5 will be described with reference to movements of a focal plane shutter and controls of an electronic shutter shown in FIGS. 3A through 3C.

In section (a) of FIG. 5, the front curtain 203-1 and the rear curtain 203-2 of the focal plane shutter of FIG. 3A are both in an open state (normal open state), and a live-view is displayed as an optical signal input through the image pickup device 204 is read as an electric signal. In the section (a), the front curtain 203-1 and the rear curtain 203-2 are mechanically held.

When a half shutter signal is input (an S1 state) at a timing (b), a charging operation or precedence operation of the focal plane shutter, for example, the rear curtain 203-2, is performed. Here, the charging operation or precedence operation is an operation of holding a shutter by using an electromagnet by releasing a mechanism (for example, a rotating-cam) coupled to the focal plane shutter. When an S1 signal is received, the shutter driver 229 drives the motor such that the front and rear curtains 203-1 and 203-2 respectively contact the front and rear electromagnets 213-1 and 213-2, and the electromagnet driver 219 outputs front and rear timing signals MG1 and MG2 for supplying power respectively to the front and rear electromagnets 213-1 and 213-2. When power is supplied to the front and rear electromagnets 213-1 and 213-2 according to the front and rear timing signals MG1 and MG2, the front and rear curtains 203-1 and 203-2 are held by an electromagnetic force generated by the front and rear electromagnets 213-1 and 213-2, as shown in FIG. 3B. In FIG. 5, the front timing signal MG1 for holding the front curtain 203-1 is output, but alternatively, the front curtain 203-1 may be fixed. The charging operation or precedence operation performed at the timing (b) may be performed in parallel to a focus detection operation according to S1, and thus a consecutive shooting speed may be improved by reducing a photographing time or shot to shot (STS) time.

When a full shutter signal is input (S2 state) at a timing (c), the front timing signal MG1 for stopping power supplied to the front electromagnet 213-1 is output, and a reset signal EFS RESET is output after an offset time. When the rear timing signal MG2 for stopping power supplied to the rear electromagnet 213-2 is output, the rear curtain 203-2 starts to drop. At this time, a mechanical reaction time lag exists, and an actual exposure is performed when the rear curtain 203-2 actually drops. Generally, a shutter lag denotes an S2 point of time to an actual exposure, and in the current embodiment, since the charging operation or precedence operation of the rear curtain 203-2 starts from an S1 point of time, the shutter lag may be reduced by about 30 ms. Here, an offset of the reset signal EFS RESET may be set to be the same as the mechanical reaction time lag of the rear curtain 203-2.

After the actual exposure is performed as the rear curtain 203-2 is dropped, the rear curtain 203-2 completely hides the image pickup device 204 and then reads out electric signals accumulated in the image pickup device 204. Then, when the rear curtain 203-2 returns back to the open state (normal open state) by being ascended, the electronic apparatus returns back to a live-view state.

Figure 6:
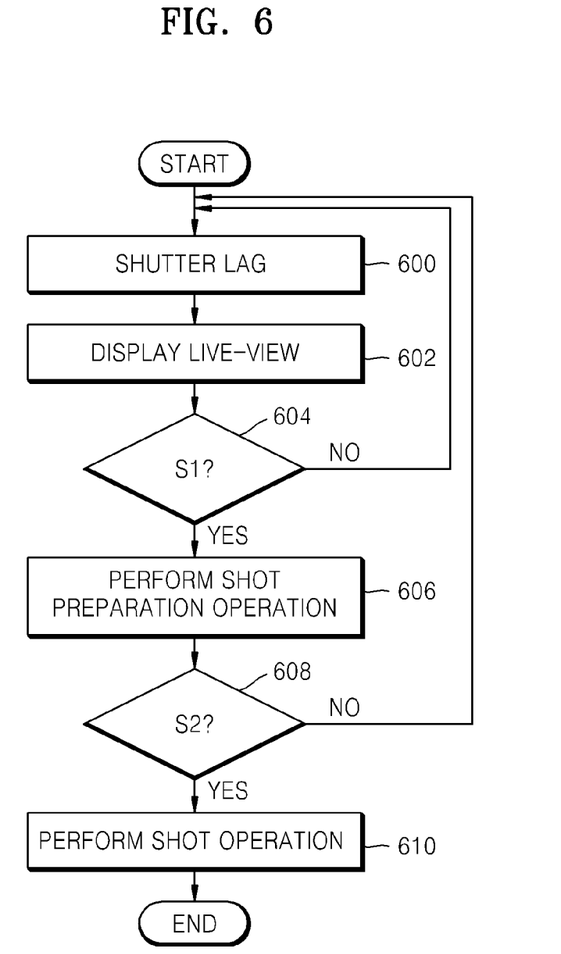
FIG. 6 is a flowchart of a method of controlling an electronic apparatus, according to an embodiment.

FIG. 6 is a flowchart of a method of controlling an electronic apparatus, according to an embodiment.

Referring to FIG. 6, a live-view is displayed in a normal open state in operations 600 and 602. Here, a focal plane shutter is in an open state.

In operation 604, it is determined whether the electronic apparatus is in an S1 state as a half shutter or a first shutter release signal is input. When the half shutter signal is input, a shot preparation operation is performed in operation 606. Here, the shot preparation operation is an operation of releasing a mechanism holding a mechanical front curtain and a mechanical rear curtain and holding the mechanical front curtain that ascended towards the mechanical rear curtain and the mechanical rear curtain by using electromagnets in the normal open state of operation 600. Since the shot preparation operation is performed in parallel to a focus detection operation according to S1, a time consumed for a charging operation (precedence operation) when a general electronic front curtain is used may be reduced. Here, the mechanical front curtain may be ascended, but may alternatively maintain an open state. In other words, when the electronic front curtain is used, the electronic front curtain is not ascended, and thus a live-view state may be continuously maintained.

In operation 608, it is determined whether the electronic apparatus is in an S2 state as a full shutter or a second shutter release signal is input. In the S2 state, a shot operation is performed. Here, in the shot operation, power supplied to the electromagnets is stopped such that the mechanical rear curtain is dropped, and exposure is performed while the electronic front curtain is controlled. When the mechanical rear curtain is dropped to the end of an image pickup device, electric signals accumulated in the image pickup device are read out, and then the mechanical rear curtain is ascended again to maintain the normal open state. When S1 is released again after S1, the electronic apparatus returns back to the normal open state of operation 600, but alternatively, a shutter may return back to the normal open state after a release state.

A shutter lag may be reduced by ⅕ to ¹/₁₀ through a shutter state transition (a charging operation or precedence operation during S1), and the shutter lag (a time after S2 to actual exposure) is about 3 ms. Also, since the charging operation is performed in parallel to the focus detection operation according to S1, an STS time may be reduced.

As described above, according to the one or more of the above embodiments, a shutter lag from when a shutter button is fully pressed to when an exposure is actually performed may be reduced by performing a precedence operation for a state transition of the shutter when the shutter button is half pressed.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. This media can be read by the computer, stored in the memory, and executed by the processor.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a", "an", and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A method of controlling an electronic apparatus operating by using a focal plane shutter, the method comprising:
   displaying a live-view in a normal open state of the focal plane shutter;
   receiving a first shutter release signal and controlling a precedence operation for an exposure of an image sensor according to the received first shutter release signal;
   receiving a second shutter release signal and performing the exposure according to the received second shutter release signal; and
   reading out an electric signal accumulated in the image sensor,
   wherein the precedence operation is performed in parallel to a focus detection operation and comprises:
   holding the focal plane shutter by using an electromagnet by driving a mechanism coupled to the focal plane shutter; and
   outputting a first timing signal for supplying power to the electromagnet when the first shutter release signal is received.

2. The method of claim 1, wherein the mechanism is a rotating-cam.

3. The method of claim 2, further comprising driving a motor transferring power to the rotating-cam.

4. The method of claim 1, further comprising outputting a second timing signal for stopping power supplied to the electromagnet according to the second shutter release signal.

5. The method of claim 1, wherein the controlling of the precedence operation comprises:
   releasing the mechanism holding a front curtain and a rear curtain of the focal plane shutter in the normal open state; and
   outputting timing signals for supplying power to a front electromagnet of the front curtain and a rear electromagnet of the rear curtain.

6. The method of claim 5, wherein the performing of the exposure comprises:
   outputting a second timing signal for stopping power supplied to the front electromagnet according to the second shutter release signal; and
   outputting a reset signal to a corresponding row line of the image sensor to correspond to a location of the rear curtain driven on the image sensor according to the second timing signal.

7. The method of claim 6, wherein the reset signal has an offset time.

8. The method of claim 7, wherein the offset time is set to be identical to a time lag from an output timing of the second timing signal for stopping power supplied to the rear electromagnet to a timing when the rear curtain starts to be driven.

9. The method of claim 1, wherein a rear curtain of the focal plane shutter operates as an electronic front curtain by outputting a reset signal to a corresponding row line of the image sensor corresponding to a location driven on the image sensor.

10. The method of claim 9, wherein the precedence operation is a charging operation of the rear curtain.

11. The method of claim 1, wherein a motor for driving the focal plane shutter is driven according to the first shutter release signal.

12. The method of claim 1, wherein the precedence operation is processed in parallel to a focus detection operation according to the first shutter release signal.

13. The method of claim 1, wherein the normal open state is a state in which a front curtain and a rear curtain of the focal plane shutter are opened.

14. An electronic apparatus comprising:
a focal plane shutter;
an electromagnet;
an image sensor;
a display unit; and
a controller that:
displays a live-view on the display unit during a normal open state of the focal plane shutter;
receives a first shutter release signal;
controls a precedence operation for an exposure of the image sensor according to the received first shutter release signal, wherein the precedence operation is an operation of holding the focal place shutter by using the electromagnet by driving a mechanism coupled to the focal plane shutter, and wherein the precedence operation is performed in parallel to a focus detection operation;
receives a second shutter release signal;
performs the exposure according to the received second shutter release signal; and
reads out an electric signal accumulated in the image sensor; and
an electromagnet driver that outputs a first timing signal for supplying power to the electromagnet when the first shutter release signal is received.

15. The electronic apparatus of claim 14, wherein the mechanism is a rotating-cam.

16. The electronic apparatus of claim 15, further comprising a shutter driver for driving a motor transferring power to the rotating-cam.

17. The electronic apparatus of claim 14, wherein the electromagnet driver:
outputs a second timing signal for stopping power supplied to the electromagnet according to the second shutter release signal.

18. The electronic apparatus of claim 14, further comprising:
a front electromagnet:
a rear curtain;
wherein the controller:
outputs a second timing signal for stopping power supplied to the front electromagnet according to the second shutter release signal; and
outputs a reset signal to a corresponding row line of the image sensor to correspond to a location of the rear curtain driven on the image sensor according to the second timing signal.

19. The electronic apparatus of claim 18, wherein the reset signal has an offset time, wherein the offset time is set to be the same as a time lag from an output timing of the second timing signal for stopping power supplied to the front electromagnet to a timing when the rear curtain starts to be driven.

20. The electronic apparatus of claim 14, further comprising:
a rear curtain of the focal plane shutter that operates as an electronic front curtain by outputting a reset signal to a corresponding row line of the image sensor corresponding to a location driven on the image sensor.

21. The electronic apparatus of claim 20, wherein the precedence operation is a charging operation of the rear curtain.

22. The electronic apparatus of claim 14, further comprising:
a motor for driving the focal plane shutter that is driven according to the first shutter release signal.

* * * * *